United States Patent
Dyksterhouse et al.

(10) Patent No.: US 6,336,186 B1
(45) Date of Patent: Jan. 1, 2002

(54) CRYPTOGRAPHIC SYSTEM AND METHODOLOGY FOR CREATING AND MANAGING CRYPTO POLICY ON CERTIFICATE SERVERS

(75) Inventors: Marc David Dyksterhouse, Sunnyvale; Jonathan David Callas, San Jose; Mark James McArdle, San Carlos, all of CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/156,266

(22) Filed: Sep. 16, 1998

Related U.S. Application Data

(60) Provisional application No. 60/091,649, filed on Jul. 2, 1998.

(51) Int. Cl.[7] ................................................. H04L 9/00
(52) U.S. Cl. ........................ 713/156; 713/168; 713/176; 380/272; 380/278; 380/282; 380/285
(58) Field of Search ................................. 380/277, 278, 380/282, 285; 713/156, 168, 176

(56) References Cited

U.S. PATENT DOCUMENTS

| | | | |
|---|---|---|---|
| 4,918,728 A | | 4/1990 | Matyas et al. |
| 5,164,988 A | | 11/1992 | Matyas et al. |
| 5,416,842 A | | 5/1995 | Aziz |
| 5,436,972 A | | 7/1995 | Fischer |
| 5,495,533 A | | 2/1996 | Linehan et al. |
| 5,499,297 A | | 3/1996 | Boebert |
| 5,604,801 A | * | 2/1997 | Dolan et al. ................... 380/21 |
| 5,604,803 A | | 2/1997 | Aziz |
| 5,694,471 A | * | 12/1997 | Chen et al. .................... 380/25 |
| 5,745,574 A | | 4/1998 | Muftic |
| 5,748,735 A | | 5/1998 | Ganesan |
| 5,751,814 A | | 5/1998 | Kafri |
| 5,761,306 A | | 6/1998 | Lewis |
| 5,799,086 A | | 8/1998 | Sudia |
| 5,841,865 A | | 11/1998 | Sudia |
| 5,850,451 A | | 12/1998 | Sudia |
| 5,922,074 A | | 7/1999 | Richard et al. |
| 5,958,050 A | | 9/1999 | Griffin et al. |
| 6,061,790 A | * | 5/2000 | Bodnar ........................ 713/171 |

\* cited by examiner

*Primary Examiner*—Thomas R. Peeso
*Assistant Examiner*—Todd Jack
(74) *Attorney, Agent, or Firm*—Patrick J. S. Inouye; John A. Smart; Christopher J. Hamaty

(57) ABSTRACT

A cryptosystem having a Certificate (Key) Server for storing and maintaining certificate or key information in a certificate database is described. The Certificate Server allows clients to submit and retrieve keys from a database based on a set of policy constraints which are set for one's particular site (e.g., company). Access to the Certificate Server is maintained by a Certificate Policy Agent, which makes sure that the policy is enforced for a given site based on the information supplied during the configuration. During operation, the Certificate Server responds to client requests to add, search for, and retrieve certificates. The server accepts or rejects certificates based on configurable parameters enforced by a Certificate Policy Agent. When a certificate is submitted to the server, the Certificate Policy Agent checks to see if it meets the criteria for a given site based on the settings specified during the configuration. Exemplary types of checks that the Certificate Policy Agent can enforce include checking to see if the key has been signed by the appropriate entities and checking to see if the signatures or User IDs associated with a key are approved for submission. If the submission criteria established during the configuration are met, the key is accepted by the server. If the key being submitted does not pass the policy requirements, it is rejected and (optionally) a copy is placed in a "pending bucket" where the key can subsequently be examined by the system administrator to determine if the key should be allowed on the server.

50 Claims, 6 Drawing Sheets

Diffie-Hellman Key Structure.

RSA Key Structure.

*600*

610

AT STARTUP TIME, INITIALIZE FROM CONFIGURATION FILE ALL REQUIRED MUSTSIGID AND ALLOWED ALLOWSIGID SIGNERIDS AND WHETHER SIGNATURE TRIMMING (TRIMSIGS) OR USERID TRIMMING (TRIMUSERS) SHOULD BE DONE.

620

UPON THE SERVER RECEIVING A CANDIDATE KEY FOR THE DATABASE, PERFORM SIGNATURE CHECKING ON CANDIDATE KEY:

630

ITERATE OVER EACH USERID ON CANDIDATE KEY:
631   GET LIST OF ALL VALID SIGNERS OF THIS USERID.
633   IF THE REQUIRED SIGNATURES EXIST ON THIS USERID, KEY PASSES POLICY AND THE LOOP IS EXITED.

640   IF NO USERID HAD THE REQUIRED SIGNATURES, THE KEY IS REJECTED AND PUT IN THE REJECT/PENDING BUCKET.

650

ITERATE OVER EACH USERID IN KEY:
651   ITERATE OVER EACH SIGNATURE ON THIS USERID:
    653   IF THE SIGNATURE IS NOT IN THE LIST OF ALLOWABLE SIGNATURES, REMOVE IT FROM THE KEY.

660

AGAIN ITERATE OVER EACH USERID IN KEY:
661   COUNT SIGNATURES ON USERID.
663   IF ZERO SIGNATURES EXIST (NOT COUNTING SELF-SIG), REMOVE THE USERID.

*FIG. 6*

CRYPTOGRAPHIC SYSTEM AND METHODOLOGY FOR CREATING AND MANAGING CRYPTO POLICY ON CERTIFICATE SERVERS

RELATED APPLICATIONS

The present application is related to and claims the benefit of priority from the following commonly-owned, co-pending U.S. provisional patent application: Ser. No. 60/091,649, filed Jul. 2, 1998, and entitled *CRYPTOGRAPHIC SYSTEM AND METHODOLOGY FOR CREATING AND MANAGING CRYPTO POLICY ON CERTIFICATE SERVERS*. The disclosure of the foregoing is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present application relates generally to cryptographic systems and, more particularly, to methods for creating and managing server-based certificate (key) crypto policy in such systems.

With each passing day, more and more computers are connected together through pervasive open networks, such as the Internet, Wide Area Networks (WANs), and the like. With the ever-increasing popularity of such environments comes the need for exchanging messages and other documents in a secured fashion over an open communication network. To this end, some sort of cryptographic system is usually employed.

Generally, cryptographic systems use either "secret-key" encryption or "public key" encryption. In "secret-key" encryption, a single key is used for both encryption and decryption. Consider, for example, a user (sender) who wants to send an e-mail message to a colleague (recipient) in a secured manner, such that no one who intercepts the message will be able to read it. If the sender employs a cryptographic "secret key" to encrypt the message, the recipient, in turn, must also use the same key to decipher or decrypt the message. As a result, the same key must be initially transmitted via secure channels so that both parties can know it before encrypted messages can be sent over insecure channels. This is typically inconvenient, however. A better approach is, therefore, sought.

Public key cryptography overcomes the problem by eliminating the need for a single "secret" key. As illustrated in FIG. 1A, each user of a public key cryptographic system has two mathematically-related keys, a "public key" and a secret or "private key." Operating in a complementary fashion, each key in the pair unlocks the code that the other key makes. Knowing the public key does not help deduce the corresponding private key, however. Accordingly, the public key can be published and widely disseminated across a communications network, such as the Internet, without in any way compromising the integrity of the private key. Anyone can use a recipient's public key to encrypt a message to that person, with the recipient, in turn, using his or her own corresponding private key to decrypt the message. One's private key, on the other hand, is kept secret, known only to the user.

Keys are typically stored on "keyrings." Public keys, including a user's own as well as those of colleagues', are stored in a "public keyring" file. A user's private key is, in a similar fashion, stored in a "private keyring" file. Each key pair has a User ID (such as the owner's name and e-mail address) so that the user and the user's colleagues can identify the owners of keys. Each private key also has a passphrase, or verbose password, that protects it. No one but a message's intended recipient can decrypt the message, not even the person who originally encrypted the message, because no one else has access to the private key necessary for decrypting the encrypted message.

Since public key cryptography provides privacy without the need for the same kind of secure channels that conventional secret key encryption requires, it is commonly employed to send secured messages and other documents from one individual to another across a network or other communication channel, including the Internet. An example of its use in a commercial product today includes PGP™, available from Pretty Good Privacy, Inc. of Santa Clara, Calif.

Keys are also used to digitally sign a message or file and, in a complementary manner, to verify a digital signature. These "digital signatures" allow authentication of messages. When a user signs a message, a cryptographic program uses that user's own private key to create a digital signature that is unique to both the contents of the message and the user's private key. Any recipient can employ the user's public key to authenticate the signature. Since the signer, alone, possesses the private key that created that signature, authentication of a signature confirms that the message was actually sent by the signer, and that the message has not been subsequently altered by anyone else. Forgery of a signed message is computationally infeasible.

By way of summary, FIG. 1B illustrates the functions for which public and private keys are used when sending and receiving messages. When keys are used to secure files stored on a user's own computer or local network server, the user is both the "sender" (the person who saves the file) and the "recipient" (the person who opens the file).

Cryptographic systems, including ones implementing public key cryptography, are described in the technical, trade, and patent literature. For a general description, see e.g., Schneier, Bruce, *Applied Cryptography*, Second Edition, John Wiley & Sons, Inc., 1996. For a description focusing on the PGP™ implementation of public key cryptography, see e.g., Garfinkel, Simon, *PGP: Pretty Good Privacy*, O'Reilly & Associates, Inc., 1995. The disclosures of each of the foregoing are hereby incorporated by reference.

Despite the benefits of public key cryptographic products, a particular problem arises in their everyday use, however. Oftentimes there exists a need for locating and sharing public cryptographic keys with peers. This is typically done through a Public Key Infrastructure, using publicly-available public key servers. The problem which arises stems from the fact that such key servers are not tailored towards corporate environments. In particular, public key servers essentially function as "dumb" repositories for keys, with the result that such servers often store many bogus keys and unnecessarily-large keys. This leads to server bloat, confusion by novice users, and inefficient use of system resources (e.g., bandwidth, CPU performance, and storage requirements).

In corporate environments, in contrast, customers (i.e., the users) demand control over keys they maintain. To date, however, the only solution available for imposing a crypto policy is a manual one: the system administrator must manually inspect and authenticate keys which have been submitted for storage on a company's key server(s). For instance, the system administrator could delete undesirable keys, User IDs, and signatures, or could be the only one allowed to add keys to the key server's database. Such a labor-intensive approach, however, places too great of a burden on the system administrator and is, thus, impractical for all but the smallest of companies. All told, there exists a need for a cryptosystem having methodology for automating the task of creating and enforcing a crypto policy at the company's key servers. The present invention fulfills this and other needs.

SUMMARY OF THE INVENTION

A cryptosystem constructed in accordance with the present invention comprises at least one client (software) running at a workstation, terminal, desktop PC, or the like, which is connected over a network (e.g., 10/100 Base T/Ethernet) to back-end server software running on a server computer. The client software includes client cryptosystem software (e.g., *PGP for Personal Privacy*, Version 5.5) for providing encryption of messages (e.g., e-mail, binary files, text (ASCII) files, or the like) for supporting secured communication between a sender and a recipient.

The cryptosystem includes at the server side a Certificate (Key) Server of the present invention for storing and maintaining certificate or key information in a certificate database. The Certificate Server allows clients to submit and retrieve keys from a database based on a set of policy constraints which are set for one's particular site (e.g., company). The Certificate Server, which is designed to run on a network operating system (e.g., Windows NT), employs Lightweight Directory Access Protocol (described below) for providing a standardized method of managing the submission and retrieval of certificates that are stored in the centralized database. In the certificate database itself, all of the necessary fields are defined and records are inserted automatically for the database during the installation process. Access to the Certificate Server is maintained by a Certificate Policy Agent, which makes sure that the policy is enforced for a given site based on the information supplied during the configuration. The configuration settings are stored in a configuration ("config") file which determines the criteria upon which certificate submissions are either accepted or rejected by the server and how certificates can be retrieved by various clients.

During operation, the Certificate Server responds to client requests to add, search for, and retrieve certificates based on the LDAP (Lightweight Directory Access Protocol) or HTTP (Hypertext Transport Protocol) protocols. The server accepts or rejects certificates based on configurable parameters enforced by the Certificate Policy Agent. The server then accepts queries and requests for certificates from users depending on the level of access they have been granted. When a certificate is submitted to the server, the Certificate Policy Agent checks to see if it meets the criteria for a given site based on the settings specified during the configuration. Exemplary types of checks that the Certificate Policy Agent can enforce include:

(1) Checks to see if the key has been signed by the appropriate entities. The system administrator (i.e., user with administrator privileges) specifies the required signatures during the configuration.

(2) Checks to see if the signatures or User IDs associated with a key are approved for submission. The administrator specifies the allowable signatures during the configuration, including specifying the option of stripping off all unauthorized signatures or User IDs from the key before it is stored on the server.

If the submission criteria established during the configuration are met, the key is accepted by the server. If the key being submitted does not pass the policy requirements, it is rejected and a copy is placed in a "pending bucket" where the key can subsequently be examined by the administrator to determine if the key should be allowed on the server.

Once a key is placed on the PGP Certificate Server, it can be retrieved by a client (e.g., PGP users) for the purposes of encrypting data and verifying digital signatures. Clients access keys on the server using standard LDAP search and retrieval functions based on the attributes associated with the keys. Exemplary attributes which one can search for keys include:

e-mail address

User name (both first and last names)

Key IDs

PGP key type, size, revocation status

Creation and expiration dates

The system administrator is provided with the same client interface to access keys, except that he or she will have a higher level of authority for adding, disabling and even deleting keys from the server.

BRIEF DESCRIPTION OF THE DRAWINGS

FIG. 6 illustrates a method of the present invention for enforcing the crypto policy on a certificate server.

GLOSSARY

Figure 1:
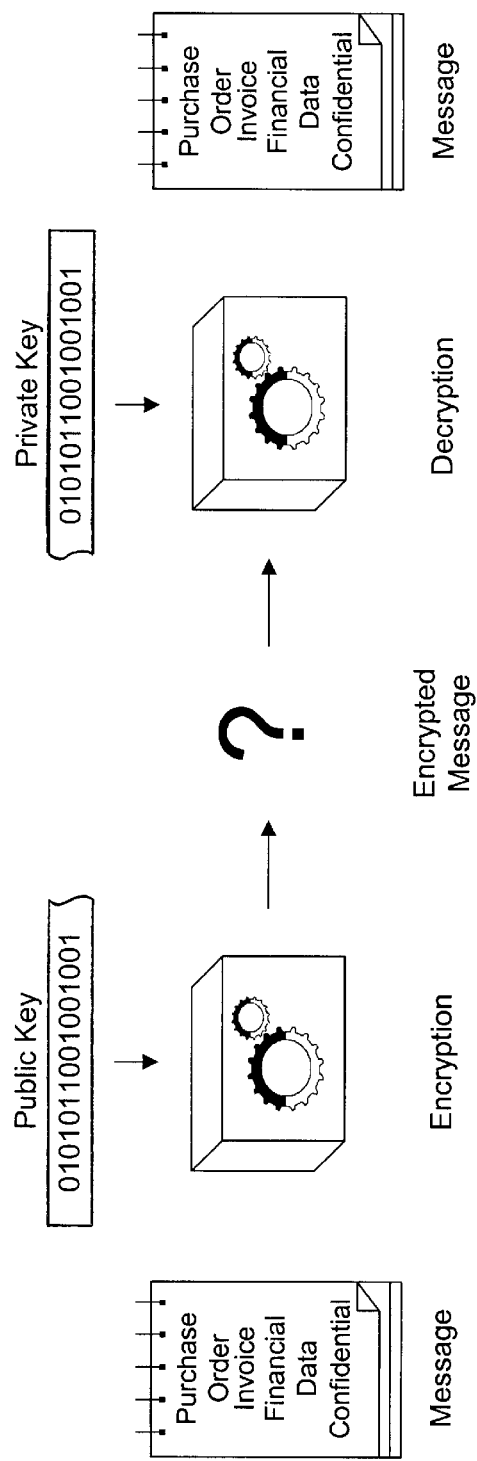
FIG. 1A is a block diagram illustrating general public key cryptography technique.
FIG. 1B is a table summarizing use of keys when sending and receiving messages.

The following definitions are offered for purposes of illustration not limitation.

ASCII-Armored Text: Binary information that has been encoded using a standard, printable, 7-bit ASCII character set, for convenience in transporting the information through communication systems. In the PGP program, ASCII-armored text files are given the .asc default filename extension, and they are encoded and decoded in the ASCII radix-64 format.

Authentication: The determination of the origin of encrypted information through the verification of someone's digital signature or someone's public key by checking its unique fingerprint.

Certify: To sign another person's public key.

Certifying Authority: One or more trusted individuals are assigned the responsibility of certifying the origin of keys and adding them to a common database.

Decryption: A method of unscrambling encrypted information so that it becomes legible again. The recipient's private key is used for decryption.

Digital Signature: See signature.

Encryption: A method of scrambling information to render it unreadable to anyone except the intended recipient, who must decrypt it to read it.

Introducer: A person or organization who is allowed to vouch for the authenticity of someone's public key. The user designates an introducer by signing that person's public key.

Key: A digital code used to encrypt, sign, decrypt and verify e-mail messages and files. Keys come in key pairs and are stored on keyrings.

Key Escrow: A practice where a user of a public key encryption system surrenders their private key to a third party thus permitting them to monitor encrypted communications.

Key Fingerprint: A uniquely identifying string of numbers and characters used to authenticate public keys. For example, one can telephone the owner of a public key and have him or her read the fingerprint associated with their key so one can compare it with the fingerprint on one's copy of their public key to see if they match. If the fingerprint does not match, then one knows one has a bogus key.

Key ID: A legible code that uniquely identifies a key pair. Two key pairs may have the same User ID, but they will have different Key IDs.

Key Pair: A public key and its complimentary private key. In public-key cryptosystems, like the PGP program, each user has at least one key pair.

Keyring: A set of keys. Each user has two types of keyrings: a private keyring and a public keyring.

Message Digest: A compact "distillate" of one's message or file checksum. It represents one's message, such that if the message were altered in any way, a different message digest would be computed from it.

Passphrase: A series of keystrokes that allow exclusive access to one's private key which one uses to sign and decrypt e-mail messages and file attachments.

Plaintext: Normal, legible, unencrypted, unsigned text.

Private Key: The secret portion of a key pair-used to sign and decrypt information. A user's private key should be kept secret, known only to the user.

Private Keyring: A set of one or more private keys, all of which belong to the owner of the private keyring.

Public Key: One of two keys in a key pair-used to encrypt information and verify signatures. A user's public key can be widely disseminated to colleagues or strangers. Knowing a person's public key does not help anyone discover the corresponding private key.

Public Keyring: A set of public keys. One's public keyring includes one's own public key(s).

Public-Key Cryptography: Cryptography in which a public and private key pair is used, and no security is needed in the channel itself.

Sign: To apply a signature.

Signature: A digital code created with a private key. Signatures allow authentication of information by the process of signature verification. When one signs a message or file, the PGP program uses one's private key to create a digital code that is unique to both the contents of the message and one's private key. Anyone can use one's public key to verify one's signature.

Text: Standard, printable, 7-bit ASCII text.

Trusted: A public key is said to be trusted by the user if it has been certified by the user or by someone the user has designated as an introducer.

User ID: A text phrase that identifies a key pair. For example, one common format for a User ID is the owner's name and e-mail address. The User ID helps users (both the owner and colleagues) identify the owner of the key pair.

Verification: The act of comparing a signature created with a private key to its public key. Verification proves that the information was actually sent by the signer, and that the message has not been subsequently altered by anyone else.

LDAP: An acronym for the Lightweight Directory Access Protocol which specifies how directory services are provided through a standard query interface.

SLAPD: An LDAP implementation developed at the University of Michigan which defines the actual functions used to access information (certificates) from a centralized server.

SLURPD: An LDAP extension that allows the contents of a database to be replicated from master to slave servers.

DETAILED DESCRIPTION OF A PREFERRED EMBODIMENT

The following description will focus on the presently-preferred embodiment of the present invention, which is typically operative in an environment providing application software running under Microsoft® Windows or Sun Solaris® operating systems. The present invention, however, is not limited to any particular one application or any particular environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NextStep, and the like. Therefore, the description of the exemplary embodiments that follows is for purposes of illustration and not limitation.

Cryptosystem Hardware and Software

Figure 2:
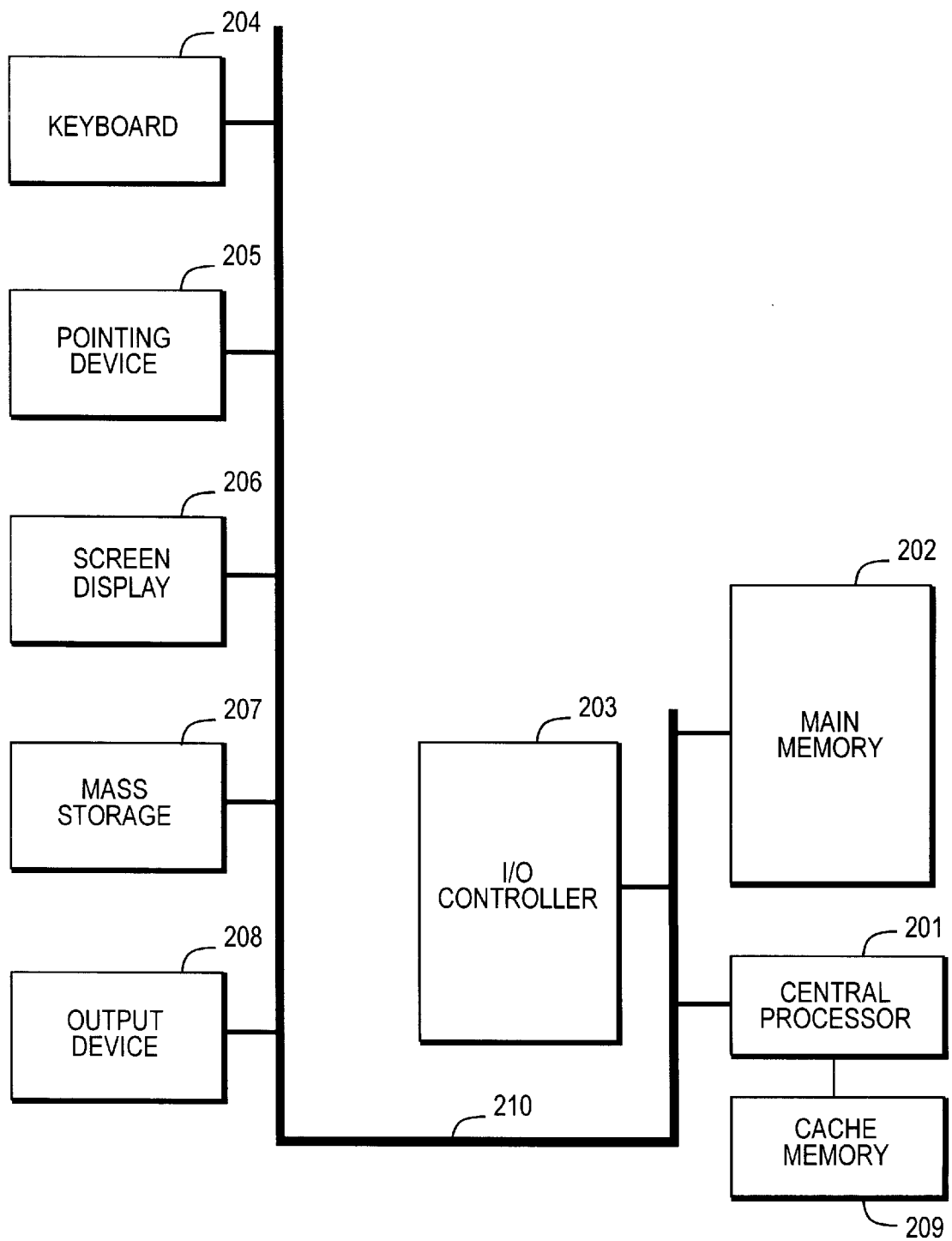
FIG. 2 is a block diagram illustrating a computer system in which the present invention may be embodied.

The invention may be embodied on a computer system such as the system of FIG. 2, which comprises a central processor 201, a main memory 202, an input/output controller 203, a keyboard 204, a pointing device 205 (e.g., mouse, track ball, pen device, or the like), a display or screen device 206, and a mass storage 207 (e.g., hard or fixed disk, removable floppy disk, optical disk, magneto-optical disk, or flash memory). Although not shown separately, a real-time system clock is included with the system 200, in a conventional manner. Processor 201 includes or is coupled to a cache memory 209 for storing frequently-accessed information; memory 209 may be an on-chip cache and/or external cache (as shown). A variety of other input/output device(s) 208, such as a modem, a scanner, a printer, a network card, or the like, may be included in the system 200 in a conventional manner, as desired. As shown, the various components of the system 200 communicate through a system bus 210 or similar architecture. In a preferred embodiment, the system 200 includes an IBM PC-compatible personal computer, available from a variety of vendors (including IBM of Armonk, N.Y.).

Figure 3:
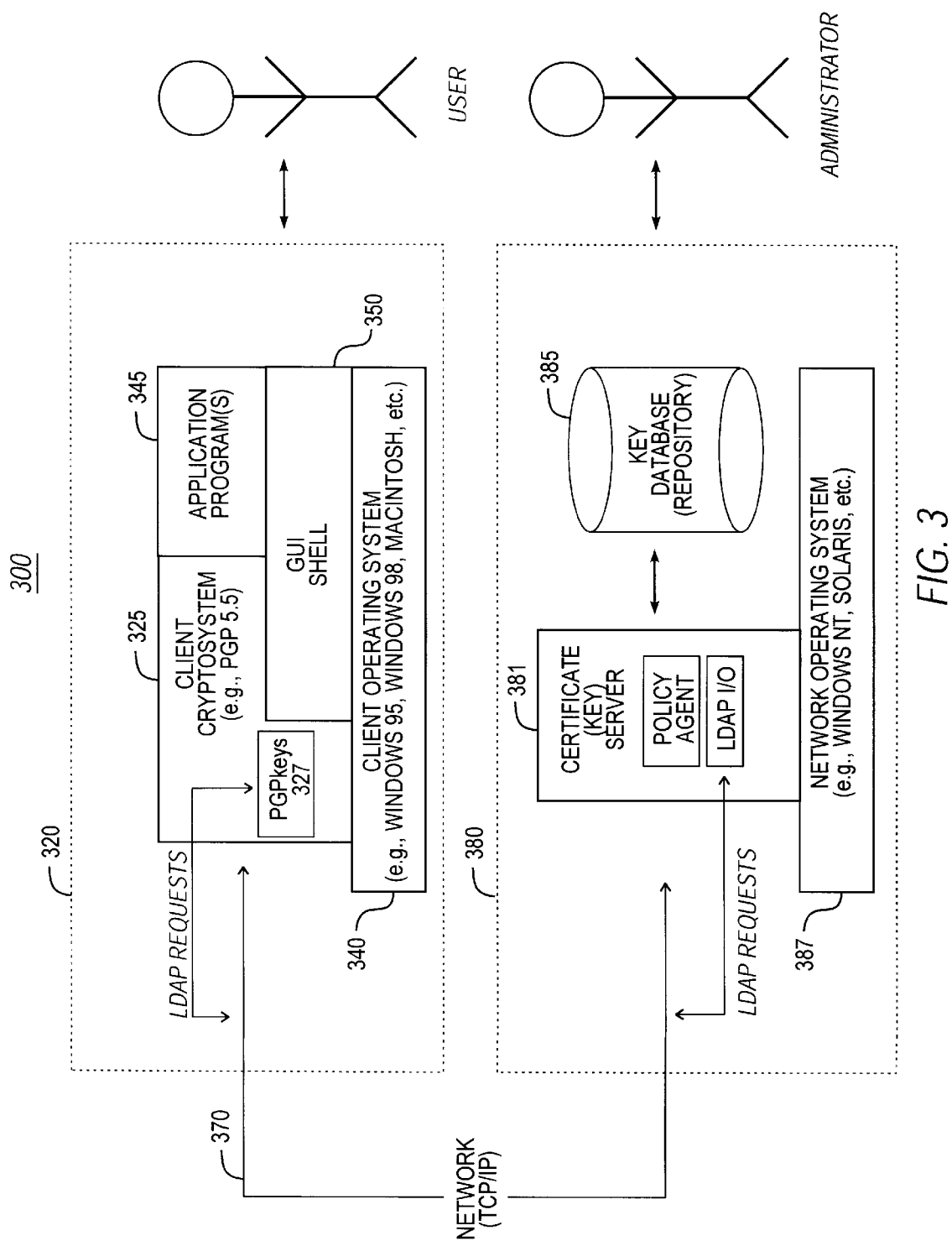
FIG. 3 is a block diagram of a cryptosystem 300 constructed in accordance with the present invention.

Illustrated in FIG. 3, a cryptosystem 300 constructed in accordance with the present invention comprises at least one client 320 running at a workstation, terminal, desktop PC (e.g., system 200), or the like, which is connected over a network 370 (e.g., 10/100 Base T/Ethernet) to back-end server software 380 running on a server computer. The client computer software 320, which is stored in system memory 202 and on persistent storage (e.g., disk memory) 207, includes a kernel or operating system (OS) 340. OS 340 is typically a client OS provided, for example, by Microsoft® Windows 95 or 98, or by Microsoft® Windows NT (Workstation Edition), which are available from Microsoft Corporation of Redmond, Wash. Alternatively, the OS 340 can be provided by IBM OS/2 (available from IBM of Armonk, N.Y.) or Macintosh OS (available from Apple Computers of Cupertino, Calif.).

In operation, one or more application programs, such as client application software or "programs" 345 are "loaded" (i.e., transferred from storage 207 into memory 202) for execution by the system 200. The operating system provides a windowing GUI (graphical user interface) shell 350, for receiving user commands and data. These inputs, in turn, may be acted upon by the system in accordance with instructions from operating system (OS) module 340, GUI shell 350, and/or application module(s) 345. The GUI also serves to display the results of operation from the OS 340, windows shell 350, and application(s) 345, whereupon the user may supply additional inputs or terminate the session. The GUI is typically provided by interaction of the application modules with the windows shell, both operating under OS 340.

As shown, one application module of the system 200 comprises a client cryptosystem software 325. This client cryptosystem, which is implemented in the commercial embodiment of PGP for Personal Privacy, Version 5.5 for Windows 95/NT (available from Pretty Good Privacy, Inc. of Santa Clara, Calif., at http://www.pgp.com), provides encryption of messages (e.g., e-mail, binary files, text (ASCII) files, or the like) for supporting secured communication between a sender and a recipient. For a general description of the system, see *PGP for Personal Privacy, Version 5.5 for Windows 95/Windows NT: User's Guide* (available for Pretty Good Privacy, Inc.). Additionally, the PGP 5.5 User's Manual is currently available on the Internet via FTP (File Transfer Protocol) at ftp://ftp.no.pgpi.com/pub/pgp/5.5/win95nt/PGP55win.pdf. The disclosure of the foregoing is hereby incorporated by reference. For further description, see commonly-owned application Ser. No. 09/090,771, filed Jun. 4, 1998, entitled *CRYPTOGRAPHIC SYSTEM WITH METHODS FOR USER-CONTROLLED KEY RECOVERY*, by inventor Philip Zimmermann, the entire disclosure of which is hereby incorporated by reference.

Figure 4:
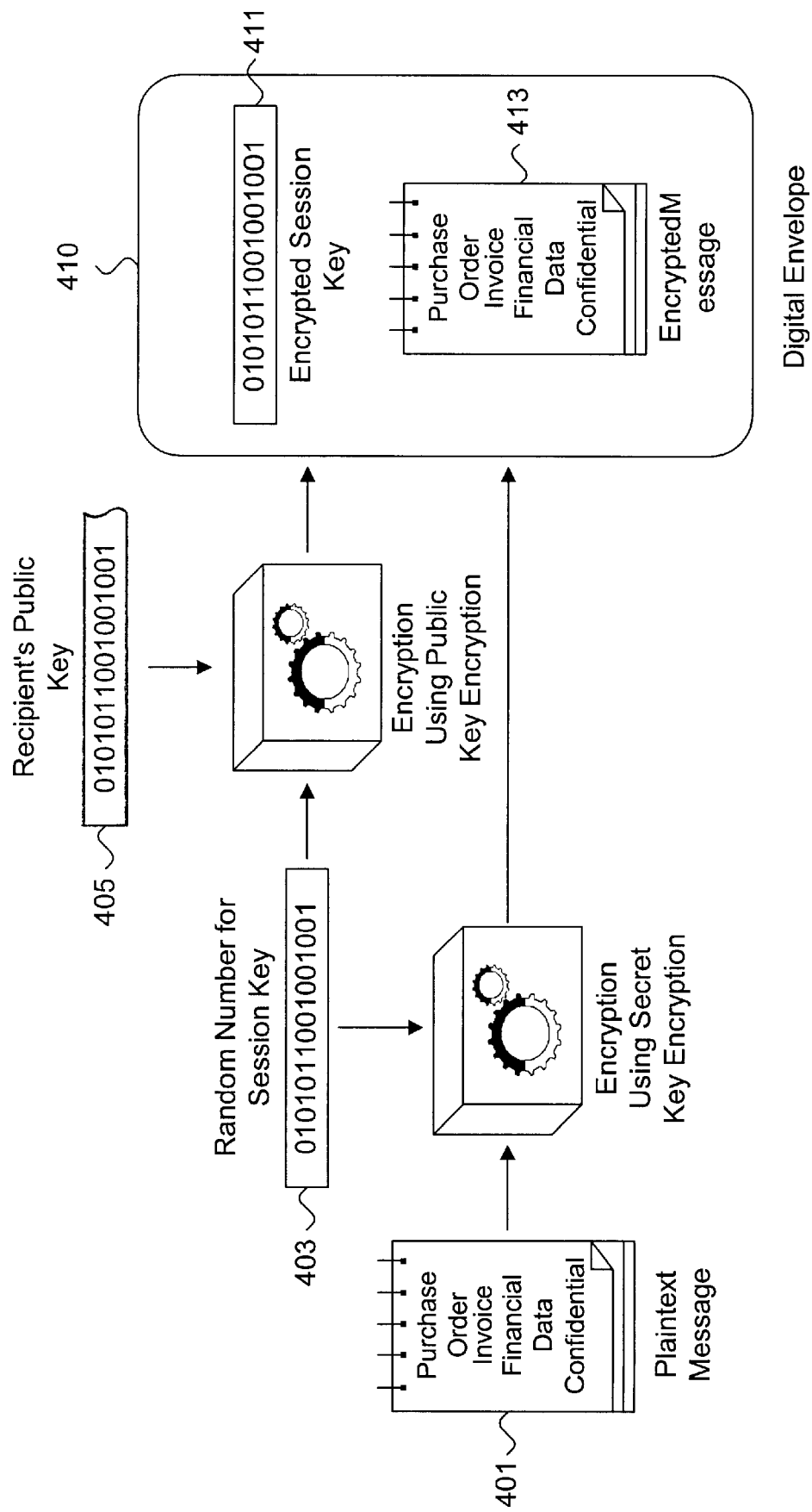
FIG. 4 is a block diagram illustrating basic encryption/decryption methodology employed by the cryptosystem of the present invention.

It is helpful to review the basic encryption/decryption methodology of the client cryptosystem 325. Because the public key encryption process is much slower than conventional single-key encryption, the client cryptosystem 325 combines elements of secret key (symmetric) cryptography with that of public key (symmetric) cryptography. FIG. 4 illustrates the basic approach. A high-quality, fast, conventional secret-key encryption algorithm is used to encipher the original unenciphered message or "plaintext" 401. The actual "bulk" enciphering mechanism employed can be any symmetric algorithm, including for instance, CAST (Carlisle Adams and Stafford Tavares), IDEA (International Data Encryption Algorithm), Blowfish, DES, or DES variants (e.g., such as triple-DES)), DES with Independent Subkeys, DESX, CRYPT(3), Generalized DES, DES with Alternate S-Boxes, RDES, s$^n$ DES, and DES with Key-Dependent S-Boxes). See e.g., Bruce Schneier, *The IDEA Encryption Algorithm,* Dr. Dobb's Journal, December 1993; Bruce Schneier, *The Blowfish Encryption Algorithm,* Dr. Dobb's Journal, April 1994, pp. 38–40; and *Data Encryption Standard* (DES), as published by the National Bureau of Standards, Department of Commerce, FIPS, pub 46, January 1977, pp. 653–670. For a description of DES variants, see e.g., the abovementioned *Applied Cryptography* by Bruce Schneier. The disclosures of each of the foregoing are hereby incorporated by reference. The cryptosystem should generally employ an enciphering mechanism stronger than DES, such as CAST or IDEA.

As part of the foregoing process and in a manner transparent to the user, the client cryptosystem 325 generates a temporary random key or "session key" 403 in FIG. 4—a key which is valid for the then-current session. In particular, the session key is used for enciphering the plaintext file, for creating an encrypted message or "ciphertext" 413. Then the recipient's public key, shown as key 405, is used to encipher this temporary random conventional key, for creating an encrypted session key 411. The public-key enciphered session key 403 together with the enciphered text 413 form a digital envelope 410 that is sent to the recipient.

To open the envelope and retrieve its message, the recipient must furnish his or her private key. The recipient does this by selecting his or her private key from a secured keyring, one which is itself protected by a passphrase. A corresponding installation of the cryptosystem at the recipient's site uses the private key to decrypt the encrypted session key. Once decrypted, the session key is used to decrypt the ciphertext, thus regenerating the original message for the recipient. Again, use of a session key at the recipient end is transparent to the recipient user.

As shown on the server side, the cryptosystem 300 includes at the server side 380 a Certificate (Key) Server 381 for storing and maintaining certificate or key information in a certificate database 385. The Certificate Server 381 allows clients (e.g., client 320) to submit and retrieve keys from a database based on a set of policy constraints which are set for one's particular site (e.g., company). In the commercial embodiment of *PGP for Personal Privacy*, a specialized key management module 327 (PGPkeys) exists as part of the client cryptosystem for supporting this process.

Features provided by the Certificate Server include:

(1) Automated installation and configuration through easy-to-use scripts and a Web-based configuration/monitoring wizard.

(2) Visual interface provides a single, point-of-control for starting and stopping the server and for monitoring various activities.

(3) Sophisticated key submission evaluations which determine whether keys are either accepted or rejected by the server based on the policy requirements established for a given site. The certificate submission criteria is specified during the configuration process and is enforced by the Certificate Policy Agent.

(4) Flexible key retrieval that supports searches on multiple key attributes, such as the key type, key ID, creation date, or the like.

(5) Authentication safeguards that restrict access to server functions by authorized users through access controls and signature verification.

(6) Ability to replicate database entries to multiple servers that are automatically updated to reflect the contents of the primary server.

The Certificate Server 381, which is designed to run on a network operating system 387 (e.g., Windows NT), employs Lightweight Directory Access Protocol (described below) for providing a standardized method of managing the submission and retrieval of certificates that are stored in the centralized database. In the certificate database itself, all of the necessary fields are defined and records are inserted automatically for the database during the installation process. Access to the Certificate Server is maintained by the Certificate Policy Agent, which makes sure that the policy is enforced for a given site based on the information supplied during the configuration. The configuration settings are stored in a configuration file which determines the criteria upon which certificate submissions are either accepted or rejected by the server and how certificates can be retrieved by various clients. A CGI interface is also provided that supports the HTTP (Hypertext Transport Protocol) protocol so that clients (e.g., PGP clients) can access the server through firewalls without having an LDAP proxy installed, which is useful for supporting clients that only have access to key servers over the Internet. If desired, an optional replication engine component may be employed for those sites that need to propagate the contents of the master database to multiple servers.

During operation, the Certificate Server responds to client requests to add, search for, and retrieve certificates based on the LDAP or HTTP protocols. The server accepts or rejects certificates based on configurable parameters enforced by the Certificate Policy Agent. The server then accepts queries and requests for certificates from users depending on the level of access they have been granted. When a certificate is submitted to the server, the Certificate Policy Agent checks to see if it meets the criteria for a given site based on the settings specified during the configuration. Exemplary types of checks that the Certificate Policy Agent can enforce include:

(1) Checks to see if the key has been signed by the appropriate entities. The system administrator (i.e., user with administrator privileges) specifies the required signatures during the configuration.

(2) Checks to see if the signatures or User IDs associated with a key are approved for submission. The administrator specifies the allowable signatures during the configuration, including specifying the option of stripping off all unauthorized signatures or User IDs from the key before it is stored on the server.

If the submission criteria established during the configuration are met, the key is accepted by the server. If the key being submitted does not pass the policy requirements, it is rejected and a copy is placed in a "pending bucket" where the key can subsequently be examined by the administrator to determine if the key should be allowed on the server.

Once a key is placed on the PGP Certificate Server, it can be retrieved by a client (e.g., PGP users) for the purposes of encrypting data and verifying digital signatures. Clients access keys on the server using standard LDAP search and retrieval functions based on the attributes associated with the keys. Exemplary attributes which one can search for keys include:

e-mail address

User name (both first and last names)

Key IDs

PGP key type, size, revocation status

Creation and expiration dates

The system administrator is provided with the same client interface to access keys, except that he or she will have a higher level of authority for adding, disabling and even deleting keys from the server.

Improved methodology of the present invention for providing automated crypto policy creation and management will now be described in detail.

Internal Methodology for Automated Crypto Policy Creation and Management

A. Key (certificate) Data Structure

Figure 5A:
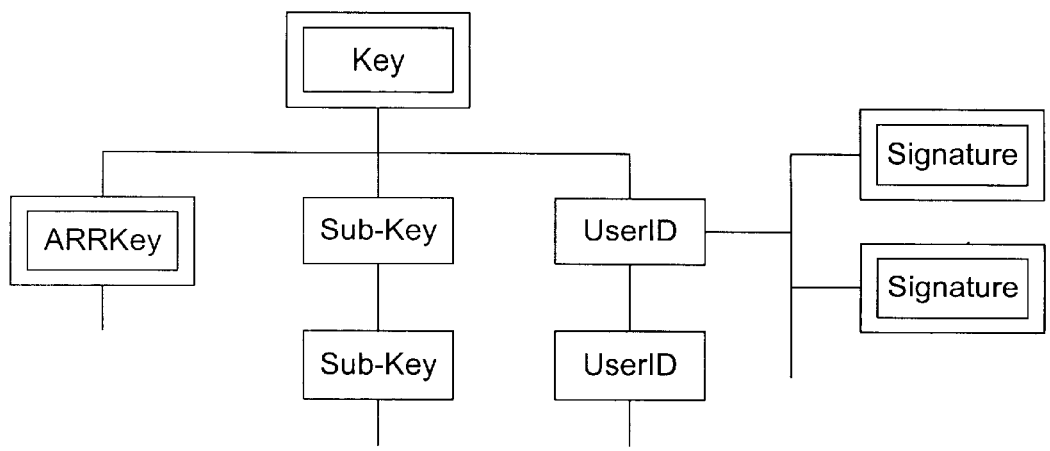
FIGS. 5A–B are block diagrams illustrating a "PGP key" or certificate data structure employed by the cryptosystem.
Figure 5B:
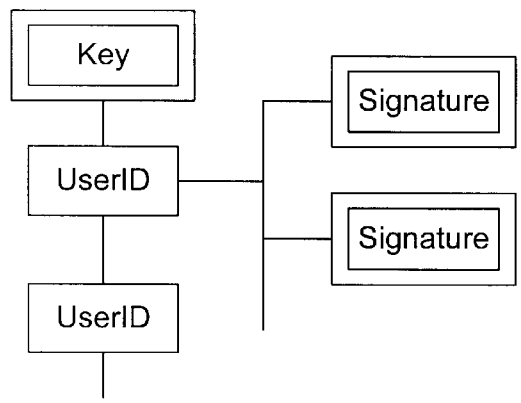

At the outset, it is helpful to review in further detail the "PGP key" or certificate data structure, which plays a central role during system operation. A PGP key always serves as a signing key and, for certain applications, also serves as an encryption key. The basic organization of the structure is illustrated by the block diagram in FIG. 5A for Diffie-Hellman-based cryptography (preferred) and by the block diagram in FIG. 5B for RSA-based cryptography. As shown, the PGP key may include one or more "sub-keys." If a sub-key is present, then it is always considered to be an encryption key. Some encryption processes, for example Diffie-Hellman, require sub-keys since the base key is always considered to be sign-only. Other encryption processes, for example RSA, do not support sub-keys, and for these the base key is used for both signing and encrypting. Diffie-Hellman keys may have associated additional recipient request keys (sometimes referred to by its marketing term, additional decryption key). When present, all messages encrypted to the base key are also automatically encrypted to each of the additional recipient request keys. A key may have any number of associated sub-keys, additional recipient request (ARR) keys, and user IDs. A user ID in turn may have any number of associated signatures.

Further description of PGP keys is available from *Inside the PGPsdk*, version 1.1, Oct. 30, 1997, available from Network Associates, Inc., the entire disclosure of which is hereby incorporated by reference. For a description of RSA-type keys, see e.g., U.S. Pat. No. 4,405,829 (Sep. 20, 1983), entitled CRYPTOGRAPHIC COMMUNICATIONS SYSTEM AND METHOD. For a description of DSS/Diffie-Hellman keys, see e.g., U.S. Pat. No. 4,200,770 (Apr. 29, 1980), entitled *CRYPTOGRAPHIC APPARATUS AND METHOD*. The disclosures of each of the foregoing patents are hereby incorporated by reference.

With a basic understanding of the general operation of the cryptosystem 300, including the organization of the PGP key data structure, the reader has a foundation for understanding the teachings of the present invention for implementing a cryptographic system providing methodology for creating and managing crypto policy on certificate servers.

B. Creating and Managing Crypto Policy on Certificate Servers

1. Internal Design

A cryptosystem constructed in accordance with the present invention automatically provides the ability to control the propagation of keys or certificates within an organization through the enforcement of a set of rules to apply to requests sent to the certificate server. In order for a certificate to be added and available for use within the organization, it must pass a check for validity based on some policy. In the currently-preferred embodiment, the certificate server supports the enforcement of the following policies:

1) Required Corporate Certification signature on all user IDs (userids)
   (a) Allows only certificates which have been signed by the appropriate certificates to be added to the directory (and made available for distribution)
   (b) Any certificate add requests which fail because of this policy will be sent to the "pending bucket" of the directory. They are then dealt with by the administrator.

2) List of permitted signatures by key ID (keyid) These signatures are allowed to be present on any certificate. Any other certificates will be stripped off.

3) Stripping all non-signed (by 1) userids Require that key must have at least one signed userid or that userid gets removed.

A PGP key is received by the certificate server using the previously-mentioned Lightweight Directory Access Protocol. The Lightweight Directory Access Protocol (LDAP) is a protocol for accessing online directory services. It runs directly over TCP/IP or Transmission Control Protocol/Internet Protocol (see e.g., TCP/IP Unleashed, Timothy Parker et al., Sams Publishing, Page 33 et. seq., the disclosure of the reference in its entirety being hereby incorporated by reference), and can be used to access a standalone LDAP directory service or to access a directory service that is back-ended by X.500 (see e.g., the X.500 tutorial at http://snad.ncsl.nist.gov/snad-staff/tebbutt/x5eg/tableofcontents2_1.html, the disclosure of the reference in its entirety being hereby incorporated by reference). The most widely used implementation of LDAP was written at the University of Michigan. The latest release of the U-M LDAP package is currently available on the Internet from the University of Michigan as a compressed Unix tar file at:

ftp://terminator.rs.itd.umich.edu/ldap/ldap-3.3.tar.Z

Additional description of LDAP is available on the Internet from the University of Michigan at:

http://www.umich.edu/~dirsvcs/ldap/index.html

For an overview of LDAP-based directory service, see e.g., Introduction to the SLAPD and SLURPD Administrator's Guide, currently available on the Internet from the University of Michigan at:

http://www.umich.edu/~dirsvcs/ldap/doc/guides/slapd/1.html#RTFToC1

Several LDAP-related RFCs have been published, including:

RFC-1777 Lightweight Directory Access Protocol.

RFC-1558 A String Representation of LDAP Search Filters

RFC-1778 The String Representation of Standard Attribute Syntaxes

RFC-1779 A String Representation of Distringuished Names

RFC-1798 Connectionless LDAP

RFC-1823 The LDAP Application Program Interface

RFC-1959 An LDAP URL Format and which are currently-available on the Internet from the University of Michigan at:

http://www.umich.edu/~dirsvcs/ldap/doc/rfc/

The disclosures of all of the foregoing LDAP-related references are hereby incorporated by reference.

In the system of the present invention, a client uses an LDAP "Add" verb to send the server a new key. Upon receiving a key, it is examined against the server's configured policy. If the key passes the policy check it is added to the database. If the key fails the policy check it is rejected and placed in a pending bucket where only server administrators can have access to the key.

The policy for a particular site is specified through configuration values that are stored in a configuration file. The following table lists all of the configuration settings along with a short description of each. The table is followed by additional descriptions for important settings in the table.

TABLE 1

CONFIGURATION SETTINGS

| Setting | Purpose |
| --- | --- |
| Allow | Defines level of access for users |
| DefaultAccess | Defines default access |
| AccessLogFile | Designates the file where access statistics are logged |
| AccessLogDetails | Determines the level of statistics recorded in the Access Log File |
| LogLevel | Determines the level of information recorded in the NT Event Log File |
| SizeLimit | Specifies the maximum number of matches returned for a query |
| TimeLimit | Specifies the maximum number of seconds allocated for a query |
| CacheEntries | Specifies the number of the database entries cached by the server |
| IdleSyncTimeout | Directs the server to save the data-base cache to disk after the server has remained idle for a specified number of seconds |
| DBCacheSize | Specifies the database cache size in bytes |
| Directory | Specifies where the database files are located |
| Mode | Specifies the file permissions associated with the database |
| ReadOnly | Specifies read/write access to data-base entries |
| MustSigID | Specifies the signatures a key must have in order to pass the policy requirement |
| TrimSigs | Instructs the server to remove unauthorized signatures from submitted keys. |
| TrimUsers | Instructs the server to remove unsigned user IDs from submitted keys. |
| AllowSigID | Indicates which keys are allowed when TrimSigs is turned on |
| PolicyFailures | Specifies whether rejected keys are sent to the pending bucket or return an error. |
| Replica | Specifies the location of the server where the database contents are to be replicated. |
| RepLogFile | Specifies the log file where changes are recorded for replication. |

When establishing access controls, there are two levels of access to be concerned with. First, one defines what type of access a particular user or group of users have to various server functions through the "Allow" configuration setting. Second, one can restrict which keys are allowed to be stored on the server by requiring them to be signed by a given key ID through the "MustSigID" configuration setting. The following is a detailed explanation of the general configuration settings that specify which users have access to the server, including how server statistics are logged, and other settings that affect how the database responds to queries.

2. Configuration Settings (a) General Settings

Allow<who><access>:

Specifies which users have what kind of access to the Certificate Server. One can use wildcard characters to include a range of users that fit a given criteria, with, for example, the following parameters set.

who ip<IP address>|host<hostname>|keyId<keyID>

This parameter specifies the IP address, hostname or (32 or 64-bit) keyID for the users whose access privileges are being defined. Notice that the first parameter identifies the method used to identify the user followed by the actual address or key IDs. For example, one would choose "ip" followed by the appropriate IP address if one intends to identify a user or group of users by their IP address. When a keyid is specified for the "who" parameter, only the "add" and "delete" access options are valid.

The parameter setting access none|compare|search|read|add|delete|all specifies the level of access granted to the specified users. There are four levels of access, and they are hierarchically accumulative, meaning that each level of access automatically includes all of the permissions granted by the lower levels of access in the hierarchy.

| | |
|---|---|
| none | Denies all access to the specified user |
| compare | If the value is known, it can be compared against the value in the database |
| search | Allows the designated users to search the contents of the database |
| read | Allows the specified user to query and retrieve keys from the server. |

The following example would provide read access to all users:

| | |
|---|---|
| allow ip * read | |
| add | Allows the specified user to query and retrieve keys and to add new keys to the server. |

The following example provides read access and add access to all users who reside at pgp.com:

| | |
|---|---|
| allow host *.pgp.com add | |
| delete | Allows the user to retrieve, add and delete keys from the server. User's with "delete" permission can delete keys from the server provided that they are using a key with a signature that has been authorized for performing this type of operation. |

The following example provides read, add and signed deletes for the users at the designated address:

allow ip 205.180.136.115 delete

Although users with "delete" permission can perform signed deletions, they are not authorized to perform LDAP deletes. When allowing delete authority, two configuration changes are required. One is to allow the host or IP to perform deletes. The other is to indicate what PGP key must sign the delete request. The first is done using either an "allow host" or "allow ip" line. The second is done using an "allow keyid" line.

| | |
|---|---|
| all | Allows the specified users to perform all of the above functions, using standard LDAP functions (add, delete and modify) to manipulate data stored in the database. This setting is not normally used with the Certificate Server, but is provided for those sites that intend to build their own LDAP front end for accessing another type of database. |

The permission granted by the first allow host or allow IP line that is encountered, takes precedence over all subsequent lines. This means that once one grants a certain type of permission to a user, any subsequent permissions that conflict with the initial level of permission are ignored. To avoid any conflicts, the most specific item is placed first. For example, one should define complete host names (e.g., admin.pgp.com) before partial host names (e.g., *.pgp.com). DefaultAccess none|compare|search|read|add|delete|all Specifies the default level of access that is granted to all users who are not covered by the access permissions specified with the "Allow" setting. Valid type values include the following.

| | |
|---|---|
| none | Denies all access to default users. |
| compare | If the value is known, it can be compared against the value in the database. |
| search | Allows default users to search the contents of the database. |
| read | Allows default users to query and retrieve keys from the server. |
| add | Allows default users to query and retrieve keys and to add new keys to the server. |
| delete | Allows default users to retrieve, add and delete keys from the server. User's with "delete" permission can delete keys from the server provided that they are using a key with a signature that has been authorized for performing this type of operation. Although users with "delete" permission can perform signed deletions, they are not authorized to perform LDAP deletes. |
| all | Allows default users to perform all of the above functions and they can use the standard LDAP functions (add, delete and modify) to manipulate data stored in the database. |

For description of AccessLogFile, AccessLogDetails, and LogLevel configuration values, see e.g., PGP® Certificate Server, Version 1.0 for NT: Administrator's Guide, available from Pretty Good Privacy, Inc., of Santa Clara, Calif. (a wholly-owned subsidiary of Network Associates, Inc.), the entire disclosure of which is hereby incorporated by reference.

(b) Certificate Policy Agent Configuration Settings

The Policy Agent configuration settings define the policy requirements for one's site. These settings are used to specify which signatures must be on a key before it will be accepted by the server and which signatures are allowed to remain on a submitted key.

MustSigID<key/ID>

Specifies the 32 or 64-bit key IDs (in hex with a prefix of '0x') for any required signatures that must be present on a client key in order for it to be accepted by the Certificate Server. One or more key IDs can be entered on a line and more than one MustSigID lines can exist in one's config file. All key IDs listed on a single line are required to be present on an added key in order for it to pass policy. Satisfying any single MustSigID line is enough to pass policy. To require multiple signatures, each of the required signatures is listed on a single line.

As an example of requiring multiple signatures on a key before it is deemed acceptable by the server (i.e., logical AND), each of the required keys is listed on a single line as follows.

MustSigID 0x1234567812345678 0x12345678

Here, the key being submitted must be signed by both keys before it is accepted by the server.

As an example of requiring at least one or another signature on a key before it is deemed acceptable by the server (i.e., logical OR), each of the optional keys are listed on a separate line as follows.

MustSigID 0xabcdef0123456789
MustSigID 0xfedcba987654321

In this case, the key being submitted must be signed by at least one of the keys in order to pass the policy requirement. Before starting the server, the required signatures should be available to the server, so that any required signature may be immediately validated. Because it is relatively easy to fabricate a key ID when using RSA keys, it is recommended that DSS/Diffie-Hellman be used for required signatures. RSA keys may still be used, but one will need to exercise extra care in making sure that the required keys are stored on the server before anyone gets the chance to substitute one of their own design.

TrimSigs yes|no

Allows one to have unauthorized signatures removed from a key before it is stored on the Certificate Server. When this setting is turned on (set to yes), all signatures except for the owner's and those listed by the MustSigID and AllowSigID settings are trimmed from the key before adding it to the server. This setting should generally not be used unless the MustSigID or AllowSigID settings are implemented. The default setting is "no."

TrimUsers yes|no

Allows one to remove unauthorized user IDs from a key before it is stored on the Certificate Server. When this setting is turned on (set to yes), all user IDs associated with a key which have not been signed, or for which only a self signature remains (after the TrimSigs step), are trimmed from the key. The default setting is "no." Note that signatures on keys made by keys from the AllowSigID and MustSigID config values are strongly authenticated prior to including them in the database. Also, self-signatures are authenticated to ensure revocation signatures are valid and that the holder of the secret key for this certificate was able to properly sign the certificate.

AllowSigID<keyID>

Lists the 32 or 64-bit key IDs for signatures that are considered allowable when the TrimSigs setting is turned on. One or more key IDs can be entered on a line and more than one AllowSigID lines can exist in one's configuration file and each is treated with equal significance. Any signature on a key that is not made by a key ID listed in one of the AllowSigID lines will be trimmed from the key prior to submission if the TrimSigs config value is enabled. The only exception is that self-signatures are never trimmed. Signatures made by keys listed in any MustSigID config value are automatically considered included in an AllowSigID line. When trimming signatures, only the owner's signature and those listed by the MustSigID and AllowSigID settings are allowed to remain on the key. All other signatures are trimmed from the key before it is placed on the server. It is an error to have trimSigs enabled and no MustSigID or AllowSigID set.

PolicyFailures pending|error

Allows one to specify whether keys that are rejected due to some policy failure are sent to the pending bucket for further evaluation or are tossed out with an accompanying error message. If set to "pending," the key is stored in the pending bucket, whereas if it is set to "error," the key is ignored and an error message is generated. The "error" setting is mostly useful for those sites that do not want to maintain a pending bucket. The default setting is "pending."

The following table summarizes the ramifications of using these settings in combination with one another.

TABLE 2

POLICY AGENT CONFIGURATION MATRIX

| MustSigID | AllowSigID | TrimUserID | TrimSigs | Server Results |
|---|---|---|---|---|
| Not set | Any or no value | No | No | The server accepts all keys regardless of how they are signed and performs no trimming. |
| Set | Any or no value | No | No | The server accepts any certificate with at least one User ID that has been signed with a key in the MustSigID list. No trimming is performed. |
| Set | Any or no value | No | Yes | The server accepts any certificate with at least one user ID that has been signed with a key in the MustSigID list. All User IDs are accepted, but only the owner's signature and those in the AllowSigID and MustSigID lists are retained; all other signatures are removed from the key. |
| Set | Any or no value | Yes | Yes | The server accepts any certificate with at least one User ID that has been signed with a key in the MustSigID list. Only User IDs that have been signed by a key listed in the MustSigID or AllowSigID lists are accepted; all other user IDs are trimmed. Only the owner's signature and those in the AllowSigID and MustSigID lists are retained; all other signatures are removed from the key. |

If a certificate has a signature from a MustSigID but that signature is revoked, it still passes policy and is allowed in the database. This is so that revoked signatures can propagate to clients that already have the certificate with the positive signature on it. One can disable the key if this behavior is not desired.

3. Internal Operation

FIG. 6 illustrates a method 600 (shown in pseudo-code) for enforcing the crypto policy on the certificate server. At startup time, shown as step 610, the Certificate Server initializes from the configuration file all required MustSigID and allowed AllowSigID signer IDs and determines whether signature trimming (TrimSigs) or user ID trimming (TrimUsers) should be done. Upon the server receiving a candidate key for the database, indicated at step 620, the server now is ready to perform signature checking on candidate key as follows.

At step 630, it iterates over each user ID on candidate key (e.g., establishing a for loop). At step 631, it gets a list of all valid signers of the current user ID. If the required signatures exist for this user ID, the key passes policy and the loop is exited, as indicated at step 633. If no user ID had the required signatures, tested at step 640, the key is rejected and put in the reject/pending bucket. At step 650, the server begins a first iteration loop over each user ID in the key. At step 651, the server establishes a nested iteration loop over each signature on this user ID. Now, at step 653, if the signature is not in the list of allowable signatures, the server removes it from the key. At step 660, the server begins a second iteration loop over each user ID in the key. At step 661, it counts signatures on user ID. If zero signatures exist (not counting self-sig), the server removes the user ID, as shown at step 663.

Appended herewith as Appendix A are C source code listings providing further description of the present invention, the disclosure of which is hereby incorporated by reference. A suitable development environment (e.g., compiler/linker) for compiling the code is available from a variety of compiler vendors, including Microsoft Corporation of Redmond, Wash. and Inprise Corporation (formally, Borland International, Inc.) of Scotts Valley, Calif. A set of comprehensive source listings for PGP 5.5.3i (Windows/Mac) itself is currently available on the Internet via FTP at ftp://ftp.no.pgpi.com/pub/pgp/5.5/win95nt/pgp553i-win95nt-src.zip (accessible from download page http://www.pgpi.com/download/#5.5i), the entire disclosure of which is hereby incorporated by reference.

Appended to the above-referenced provisional application Ser. No. 60/091,649 as Appendix B is PGP® Certificate Server, Version 1.0 for NT: Administrator's Guide, published by Pretty Good Privacy, Inc., of Santa Clara, Calif. (a wholly-owned subsidiary of Network Associates, Inc.), which provides further description of the present invention, the entire disclosure of which is hereby incorporated by reference. Additionally, appended to the above-referenced provisional application Ser. No. 60/091,649 as Appendix C is Chapter 2: Function Reference—Key Management Functions (pp. 35–110) from Inside the PGPsdk, version 1.1, Oct. 30, 1997, available from Network Associates, Inc., the entire disclosure of which is hereby incorporated by reference.

While the invention is described in some detail with specific reference to a single-preferred embodiment and certain alternatives, there is no intent to limit the invention to that particular embodiment or those specific alternatives. Although examples have been presented using clients connected to a server over a network, for instance, those skilled in the art will appreciate that the methodology of the present invention may be applied to different modes of inter-computer communication, including wireless communication. Thus, the true scope of the present invention is not limited to any one of the foregoing exemplary embodiments but is instead defined by the appended claims.

Appendix A

32

```
/*
pgpPolicy.h -- do PGP policy enforcement.

Copyright 1997, Pretty Good Privacy, Inc. All rights reserved.

*/ ifndef __PGPPOLICY_H__
define __PGPPOLICY_H__ 1

PGPError InitPolicy(PGPContextRef pPGPCtx, Backend *pBackend);
PGPError CheckPolicy(PGPKeySetRef theKey, Connection *conn,
                                PGPBoolean *pbModified);

#endif
------------------------------------------------------------------------

/*
pgpPolicy.c -- do PGP policy enforcement.

Copyright 1997, Pretty Good Privacy, Inc. All rights reserved.

*/
#include <stdio.h>
#include <string.h>
#include <time.h>
#ifdef WIN32
#include <malloc.h>
endif include "pgpFeatures.h"
include "pgpUtilities.h"
#include "pgpKeys.h"
#include "pgpErrors.h"
#include "pgpDebug.h"

#include "slap.h"
#include "back-ldbm.h"

#include "pgpPolicy.h"
#include "pgpCertSrvUtils.h"
#include "pgpBEUtils.h"

#define PASS 1
#define FAIL 0

PGPError
GetSigIDsOfUserID(PGPKeyIterRef SigIter, PGPBoolean bCheckValidity,
                PGPBoolean bReturnTrustedOnly, PGPByte **ppchAllSigIDs,
                PGPUInt32 *pulCntSigIDs);

PGPError
KeySet2Key(PGPKeySetRef CertSet, PGPKeyRef *pCert);

/*
 * Given a KeyID, find the full key by looking in either the keyring
 * file supplied or in the active database.
```

33

```
        */
        static PGPError
        ConvertKeyIDtoKeySet(PGPContextRef pPGPCtx, Backend *pBackend,
                             PGPKEYID **ppIDList, PGPKeySetRef *pNewKeySet,
  5                          PGPUInt32 *pulKeyCnt)
        {
            PGPError        pgpFRC = kPGPError_NoErr;
            PGPError        pgpErr;
            PGPKEYID        **ppList;
 10         PGPKEYID        *pID;
            char            *pchKeyBlock;
            PGPUInt32       ulKeyBlockLen;
            PGPKeySetRef    ImportedKeySet = kPGPInvalidRef;
            PGPKeyID        KeyID;
 15         PGPKeyRef       Key;
            PGPKeySetRef    SingletonKeySet = kPGPInvalidRef;
            char            szMesg[200];

Debug(LDAP_DEBUG_TRACE, "=> ConvertKeyIDtoKeySet\n", 0, 0, 0 );
 20
            /* If the resulting keyset hasn't been created, create it first. */
            if (*pNewKeySet == kPGPInvalidRef) {
                *pulKeyCnt = 0;
                pgpErr = PGPNewKeySet(pPGPCtx, pNewKeySet);
 25             CheckException(IsPGPError(pgpErr), EXC_MEMORY_ERROR);
            } ppList = ppIDList;
            while (*ppList != NULL) {
 30
                pID = *ppList;
                while (pID != NULL) {

/* If a keyring file was supplied, pull all trusted keys from */
 35                 /*   that.  Otherwise, hope they are already in the database.   */
                    /*   Looking in db may go away in future. */
                    if (g->KeyRingSet != kPGPInvalidRef) { pgpErr = PGPGetKeyIDFromString(pID->keyid, &KeyID);
 40                     CheckException(IsPGPError(pgpErr), EXC_INVALID_KEYID);

pgpErr = PGPGetKeyByKeyID(g->KeyRingSet, &KeyID,
                                            kPGPPublicKeyAlgorithm_Invalid, &Key);
                        if (pgpErr != kPGPError_ItemNotFound) {
 45                         char        szKeyID[kPGPMaxKeyIDStringSize];

CheckException(IsPGPError(pgpErr),
                                            EXC_KEYID_NOT_FOUND_IN_KEYRING);

50                         pgpErr = PGPGetKeyIDFromKey(Key, &KeyID);
                            CheckException(IsPGPError(pgpErr), EXC_INVALID_KEYID);

pgpErr = PGPGetKeyIDString(&KeyID, kPGPKeyIDString_Full,
                                                        szKeyID);
 55                         CheckException(IsPGPError(pgpErr), EXC_INVALID_KEYID);

strcpy(pID->keyid, &szKeyID[2]);

pgpErr = PGPNewSingletonKeySet(Key, &SingletonKeySet);
 60                         CheckException(IsPGPError(pgpErr),
                                            EXC_CREATING_KEYSET_FAILED);

PGPAddKeys(SingletonKeySet, *pNewKeySet);
```

34

```
                PGPFreeKeySet(SingletonKeySet);
            }
        }
        if (g->KeyRingSet == kPGPInvalidRef
            || pgpErr == kPGPError_ItemNotFound) {

/* Need to normalize/uppercase key id. */
            dn_upcase(pID->keyid);
            pgpErr = KeyID2KeyBlock(pBackend, pID->keyid, &pchKeyBlock,
                                    &ulKeyBlockLen);
            CheckException(IsPGPError(pgpErr), EXC_KEYID_NOT_FOUND_IN_DB);

pgpErr = PGPImportKeySet(pPGPCtx, &ImportedKeySet,
                            PGPOInputBuffer(pPGPCtx, pchKeyBlock,
    ulKeyBlockLen),
                            PGPOLastOption(pPGPCtx));
            CheckException(IsPGPError(pgpErr),
                            EXC_IMPORTING_KEYBLOCK_FAILED);

pgpErr = PGPAddKeys(ImportedKeySet, *pNewKeySet);
            CheckException(IsPGPError(pgpErr),
                            EXC_ADDING_KEYSET_FAILED);

PGPFreeKeySet(ImportedKeySet);
            free(pchKeyBlock);
        }

/* Increment counter they pass in once for each key successfully */
        /*    added to new keyset. */
        (*pulKeyCnt)++;
        pID = pID->pnext;

}
        *ppList++;
    }

Exit;  /*-- End of Normal Code Block -- */

/* ---------------- Exception Blocks ------------------- */

ExceptionBlock(EXC_MEMORY_ERROR):
        LogError(kErrLevelError, vszMemoryError);
        pgpFRC = kPGPError_OutOfMemory;
    Exit;

ExceptionBlock(EXC_INVALID_KEYID):
        LogError(kErrLevelError, "Invalid Key ID (%s).", pID->keyid);
        pgpFRC = kPGPError_ItemNotFound;
    Exit;

ExceptionBlock(EXC_KEYID_NOT_FOUND_IN_KEYRING):
        LogError(kErrLevelError, "Cannot find trusted key (%s) in public "
                "keyring.", pID->keyid);
        pgpFRC = pgpErr;
    Exit;

ExceptionBlock(EXC_CREATING_KEYSET_FAILED):
        PGPGetErrorString(pgpErr, sizeof(szMesg), szMesg);
        LogError(kErrLevelError, "Loading trust key (%s) failed with "
                "error %d (%s)", pID->keyid, pgpErr, szMesg);
        pgpFRC = pgpErr;
    Exit;
```

35

```
       ExceptionBlock(EXC_KEYID_NOT_FOUND_IN_DB):
           LogError(kErrLevelError, "Cannot find trusted key (%s) in database.",
                   pID->keyid);
           pgpFRC = pgpErr;
 5     Exit;

ExceptionBlock(EXC_IMPORTING_KEYBLOCK_FAILED):
           PGPGetErrorString(pgpErr, sizeof(szMesg), szMesg);
           LogError(kErrLevelError, "Loading trust key (%s) failed with "
10                 "error %d (%s)", pID->keyid, pgpErr, szMesg);
           pgpFRC = pgpErr;
       Exit;

ExceptionBlock(EXC_ADDING_KEYSET_FAILED):
15         PGPGetErrorString(pgpErr, sizeof(szMesg), szMesg);
           LogError(kErrLevelError, "Loading trust key (%s) failed with "
                   "error %d (%s)", pID->keyid, pgpErr, szMesg);
           pgpFRC = pgpErr;
       Exit;
20
       ExitBlock:

Debug(LDAP_DEBUG_TRACE, "<= ConvertKeyIDtoKeySet\n", 0, 0, 0);
25         return pgpFRC;
       }

/*
30  *  This routine sets up the policy stuff. It must be called after the ldap server
    *  is initialized, as it has to get certs out of the db.
    */
   PGPError InitPolicy(PGPContextRef pPGPCtx, Backend *pBackend)
   {
35     PGPError        pgpFRC = kPGPError_NoErr;
       PGPError        pgpErr;

Debug(LDAP_DEBUG_TRACE, "=> InitPolicy\n", 0, 0, 0 );

40     /* Open the keyrings if available. */
       pgpErr = GetKeySetFromKeyRings(pPGPCtx, g->pszPublicKeyRing,
                                     g->pszPrivateKeyRing, &g->KeyRingSet);
       CheckException(IsPGPError(pgpErr), EXC_GETTING_KEYRING_FAILED);

45     pgpErr = ConvertKeyIDtoKeySet(pPGPCtx, pBackend, g->ppMustSigIds,
                                     &g->BlessedKeys, &g->ulBlessedKeysCnt);
       CheckException(IsPGPError(pgpErr), EXC_CREATING_KEYSET_FAILED);

pgpErr = ConvertKeyIDtoKeySet(pPGPCtx, pBackend, g->ppAllowSigIds,
50                                   &g->BlessedKeys, &g->ulBlessedKeysCnt);
       CheckException(IsPGPError(pgpErr), EXC_CREATING_KEYSET_FAILED);

pgpErr = ConvertKeyIDtoKeySet(pPGPCtx, pBackend, g->apAllowAddKeyIDs,
                                     &g->AllowAddKeySet, &g->ulAllowAddKeysCnt);
55     CheckException(IsPGPError(pgpErr), EXC_CREATING_KEYSET_FAILED);

pgpErr = ConvertKeyIDtoKeySet(pPGPCtx, pBackend, g->apAllowDltKeyIDs,
                                     &g->AllowDltKeySet, &g->ulAllowDltKeysCnt);
       CheckException(IsPGPError(pgpErr), EXC_CREATING_KEYSET_FAILED);
60
       Exit;   /*-- End of Normal Code Block -- */

/* ---------------- Exception Blocks ------------------ */
```

36

```
        ExceptionBlock(EXC_GETTING_KEYRING_FAILED):
            pgpFRC = pgpErr;
        Exit;

ExceptionBlock(EXC_CREATING_KEYSET_FAILED):
            pgpFRC = pgpErr;
        Exit;

ExitBlock:
            Debug(LDAP_DEBUG_TRACE, "<= InitPolicy\n", 0, 0, 0);
            return pgpFRC;
    }

/*
     * Helper function for IsInTextIDs
     */
    static long tidequal(char *theID, char *textIDs)
    {
        int i;

if (*textIDs == 0)
            return 0;

textIDs++;
        for (i = 0; i < 16; i++)
            if (toupper(*textIDs++) != toupper(*theID++))
                return 0;
        return 1;
    }

/*
     * Helper function for VerifyConjunct
     */
    static long IsInTextIDs(char *theID, char *textIDs, unsigned long textIDsCount)
    {
        unsigned long      i;

if (textIDs != NULL && theID != NULL)
            for (i = 0; i < textIDsCount; i++)
            {
                if (tidequal(theID, textIDs))
                    return PASS;
                textIDs += 17;
            } return FAIL;
    }

/*
     * Helper function for VerifyMustPolicy
     */
    static unsigned long
    VerifyConjunct(PGPKEYID *id, char *textIDs, unsigned long sigCount)
    {
        unsigned long    status = 0;
        unsigned long    retval = PASS;

while (id)
        {
```

37

```
            if (!IsInTextIDs(id->keyid, textIDs, sigCount))
            {
                retval = FAIL;
                break;
            } id = id->pnext;
        } return retval;
    }

/*
     * Helper function for CheckPolicy
     */
    static unsigned long VerifyMustPolicy(char *textIDs, unsigned long sigCount)
    {
        PGPKEYID        **list = g->ppMustSigIds;
        unsigned long   status;
        unsigned long   retval = FAIL;

if (g->ppMustSigIds == NULL)
            return PASS;

if (*g->ppMustSigIds == NULL)
            return PASS;

while (*list)
        {
            PGPKEYID *id = *list;
            status = VerifyConjunct(id, textIDs, sigCount);
            if (status == PASS)
            {
                retval = status;
                break;
            }
            list++;
        } return retval;
    }

/*
     * Helper function for PerformTrimming
     */
    static void TrimSigs(PGPKeySetRef theKeySet, PGPKeySetRef pBlessedKeys,
                        PGPBoolean *pbModified)
    {
        PGPError        status;
        PGPKeyListRef   KeyList;
        PGPKeyIterRef   KeyIter;
        PGPKeyRef       theKey, certKeyRef;
        PGPUserIDRef    User;
        PGPSigRef       Cert;
        PGPKeyID        theKeyID;

status = PGPOrderKeySet(theKeySet, kPGPAnyOrdering, &KeyList);
        status = PGPNewKeyIter(KeyList, &KeyIter);
        status = PGPKeyIterNext(KeyIter, &theKey);

status = PGPGetKeyIDFromKey(theKey, &theKeyID);  /* get the keyid of this key */
```

38

```
        while (IsntPGPError(PGPKeyIterNextUserID(KeyIter, &User)))
        {
            while(IsntPGPError(PGPKeyIterNextUIDSig(KeyIter, &Cert)))
            {
                PGPKeyID        tempKeyID;
                PGPInt32        alg;

/* Get the algorithm of the signer */
                status = PGPGetSigNumber(Cert, kPGPSigPropAlgID, &alg);

/* Get the KeyID of the signer */
                status = PGPGetKeyIDOfCertifier(Cert, &tempKeyID);

/* Always allow self-sigs and corporate sigs. */
                if (PGPCompareKeyIDs(&theKeyID, &tempKeyID) != 0)
                {
                    status = PGPGetKeyByKeyID(pBlessedKeys, &tempKeyID, alg,
        &certKeyRef);

if (certKeyRef == kPGPInvalidRef)
                    {
                        status = PGPRemoveSig(Cert);
                        *pbModified = TRUE;
                    }
                }
            }
        }

PGPFreeKeyIter(KeyIter);
        PGPFreeKeyList(KeyList);
    }

/*
 * Helper function for PerformTrimming
 */
static int TrimUsers(PGPKeySetRef theKeySet, PGPBoolean *pbModified)
{
    PGPError        status;
    PGPKeyListRef   KeyList;
    PGPKeyIterRef   KeyIter;
    PGPKeyRef       theKey;
    PGPUserIDRef    User;
    PGPSigRef       Cert;
    PGPUInt32       ulUserIDCnt;
    PGPUInt32       ulNumDeleted;

status = PGPOrderKeySet(theKeySet, kPGPAnyOrdering, &KeyList);
    status = PGPNewKeyIter(KeyList, &KeyIter);
    status = PGPKeyIterNext(KeyIter, &theKey);

ulUserIDCnt = 0;
    ulNumDeleted = 0;

while (IsntPGPError(PGPKeyIterNextUserID(KeyIter, &User)))
    {
        long certCount = 0;

ulUserIDCnt++;

while(IsntPGPError(PGPKeyIterNextUIDSig(KeyIter, &Cert)))   /* count the
certs */
        {
```

39

```
                certCount++;
        }

/* If only a self-sig is left, trim this user.  This assumes only */
        /*    one self-sig can exist on a user ID. */
        if (certCount == 1)
        {
            PGPKeyID        theKeyID;
            PGPKeyID        tempKeyID;

/* Go back and get the first (and only) sig. */
            PGPKeyIterRewindUIDSig(KeyIter);
            PGPKeyIterNextUIDSig(KeyIter, &Cert);

/* Get the KeyID of this key and the signer. */
            PGPGetKeyIDFromKey(theKey, &theKeyID);
            PGPGetKeyIDOfCertifier(Cert, &tempKeyID);

/* If the same, only self-sig so remove it. */
            if (PGPCompareKeyIDs(&theKeyID, &tempKeyID) == 0) {
                PGPRemoveUserID(User);
                ulNumDeleted++;
                *pbModified = TRUE;
            }
        }
        else if (certCount == 0)
        {
            status = PGPRemoveUserID(User);
            ulNumDeleted++;
            *pbModified = TRUE;
        }
    }

PGPFreeKeyIter(KeyIter);
    PGPFreeKeyList(KeyList);

/* If all userIDs are deleted, the cert is no longer valid. */
    if (ulNumDeleted == ulUserIDCnt)
        return -1;
    else
        return 0;
}

/*
 * Helper function for CheckPolicy
 */
static int PerformTrimming(PGPKeySetRef theKeySet, PGPKeySetRef pBlessedKeys,
                            PGPBoolean *pbModified)
{
    int status = 0;

if (g->bTrimSigs)
        TrimSigs(theKeySet, pBlessedKeys, pbModified);

if (g->bTrimUserIDs)
        status = TrimUsers(theKeySet, pbModified);

return status;
}

/*
```

40

```
        This routine checks to see if a cert matches policy.
        Note that it assumes that the keyset passed to it holds exactly one key.
        Returns: 2 if key is no longer valid.
                 PGPCDK error otherwise
 5               kPGPError_KeyInvalid means failed policy requirements.
     */
     PGPError CheckPolicy(PGPKeySetRef theKeySet, Connection *conn,
                          PGPBoolean *pbModified)
     {
10       PGPError        status;
         PGPError        retval = kPGPError_NoErr;
         PGPKeyListRef   KeyList = NULL;
         PGPKeyIterRef   KeyIter = NULL;
         PGPKeyRef       theKey;
15       unsigned char   *sigIDs = NULL; /* array of 17-byte sigids */
         PGPUInt32       sigCount;
         PGPUserIDRef    User;

Debug(LDAP_DEBUG_TRACE, "=> CheckPolicy\n", 0, 0, 0 );
20
         *pbModified = FALSE;

/* Check the key's self sig and general format.  This can be turned off */
         /*   to speed up adds. */
25       if (g->bCheckSigs) {
             status = PGPCheckKeyRingSigs(theKeySet, theKeySet, FALSE,
                                          NULL, NULL);
             CheckException(IsPGPError(status), EXC_CHECK_SELF_CERTS_FAILED);

30           /* Check the new key's signatures based on the blessed key's.  Non- */
             /*   blessed key sigs are not checked. */
             if (g->ulBlessedKeysCnt > 0) {
                 status = PGPCheckKeyRingSigs(theKeySet, conn->BlessedKeys, FALSE,
                                              NULL, NULL);
35               CheckException(IsPGPError(status), EXC_CHECK_CERTS_FAILED);
             }

/* Propagate the trust over the key. */
             /*   !!! THIS WON'T BE NECESSARY IN THE NEAR FUTURE. */
40           status = PGPPropagateTrust(theKeySet);
             CheckException(IsPGPError(status), EXC_TRUST_PROPAGATION_FAILED);
         }

/* Don't even bother checking MustPolicy if nothing was set. */
45       if (g->ppMustSigIds != NULL && *g->ppMustSigIds != NULL) {

/* Create key iterator. */
             status = PGPOrderKeySet(theKeySet, kPGPAnyOrdering, &KeyList);
             CheckException(IsPGPError(status), EXC_KEYSET_OP_FAILED);
50           status = PGPNewKeyIter(KeyList, &KeyIter);
             CheckException(IsPGPError(status), EXC_KEYSET_OP_FAILED);
             status = PGPKeyIterNext(KeyIter, &theKey);
             CheckException(IsPGPError(status), EXC_KEYSET_OP_FAILED);

55           /* A key with no userIDs always fails policy. */
             status = FAIL;
             while (IsntPGPError(PGPKeyIterNextUserID(KeyIter, &User)))
             {
                 if (g->bCheckSigs)
60                   status = GetSigIDsOfUserID(KeyIter, TRUE, TRUE, &sigIDs,
                                                &sigCount);
                 else
                     status = GetSigIDsOfUserID(KeyIter, FALSE, FALSE, &sigIDs,
                                                &sigCount);
```

```
            CheckException(IsPGPError(status), EXC_GETTING_IDS_FAILED);

status = VerifyMustPolicy(sigIDs, sigCount);
            if (status == PASS)
                break;
        }

CheckException(status != PASS, EXC_MUST_POLICY_FAILED);
    } status = PerformTrimming(theKeySet, conn->BlessedKeys, pbModified);
    CheckException(status != 0, EXC_TRIM_AWAY_EVERYTHING);

Exit;   /*-- End of Normal Code Block -- */

/* ---------------- Exception Blocks ------------------- */

ExceptionBlock(EXC_CHECK_SELF_CERTS_FAILED):
        Debug(LDAP_DEBUG_ERROR,
            "CheckPolicy: Checking certificate's self-signatures failed, rc = %d\n",
            status, 0, 0);
        retval = status;
    Exit;

ExceptionBlock(EXC_CHECK_CERTS_FAILED):
        Debug(LDAP_DEBUG_ERROR,
            "CheckPolicy: Checking certificate's signatures failed, rc = %d\n",
            status, 0, 0);
        retval = status;
    Exit;

ExceptionBlock(EXC_TRUST_PROPAGATION_FAILED):
        Debug(LDAP_DEBUG_ERROR,
            "CheckPolicy: Determining certificate's trust failed, rc = %d\n",
            status, 0, 0);
        retval = status;
    Exit;

ExceptionBlock(EXC_KEYSET_OP_FAILED):
        Debug(LDAP_DEBUG_ERROR,
            "CheckPolicy: Keyset operation failed, rc = %d\n", status, 0, 0);
        retval = status;
    Exit;

ExceptionBlock(EXC_GETTING_IDS_FAILED):
        Debug(LDAP_DEBUG_ERROR,
            "CheckPolicy: Getting signers failed, rc = %d\n", status, 0, 0);
        retval = status;
    Exit;

ExceptionBlock(EXC_MUST_POLICY_FAILED):
        Debug(LDAP_DEBUG_ERROR,
            "CheckPolicy: Did not pass policy, rc = %d\n", status, 0, 0);
        retval = kPGPError_KeyInvalid;
    Exit;

ExceptionBlock(EXC_TRIM_AWAY_EVERYTHING):
        Debug(LDAP_DEBUG_ERROR,
            "CheckPolicy: After trimming, nothing was left\n", 0, 0, 0);
        retval = 2;
    Exit;

ExitBlock:
```

```
            if (KeyIter != NULL)
                PGPFreeKeyIter(KeyIter);
            if (KeyList != NULL)
                PGPFreeKeyList(KeyList);

free(sigIDs);

Debug(LDAP_DEBUG_TRACE, "<= CheckPolicy, rc=%d\n", retval, 0, 0);
            return retval;
        }

---------------------------------------------------------------------------
        From pgpAdd.c:

/*
         * Get all subsequent signer IDs of the User ID that the iterator
         * currently points to.  Allocate the array that they are returned in.
         * Called by CheckPolicy.
         */
        PGPError
        GetSigIDsOfUserID(PGPKeyIterRef SigIter, PGPBoolean bCheckValidity,
                          PGPBoolean bReturnTrustedOnly, PGPByte **ppchAllSigIDs,
                          PGPUInt32 *pulCntSigIDs)
        {
            PGPError        ulFRC = 0;
            PGPError        pgpRC;
            PGPUInt32       ulMaxSigIDs;
            PUCHAR          pchSigIDHead;
            PUCHAR          pchSigID;
            PGPBoolean      bRevoked;
            PGPSigRef       Sig = NULL;
            PGPBoolean      bGood;
            PGPBoolean      bTried;
            PGPBoolean      bWellFormed;
            PGPBoolean      bUnverifiedRevoked;
            PGPBoolean      bExportable;
            PGPBoolean      bExpired;
            PGPByte         szCDKSigID[kPGPMaxKeyIDStringSize];
            PGPKeyID        SigID;

Debug(LDAP_DEBUG_TRACE, "=> GetSigIDsOfUserID\n", 0, 0, 0 );

*ppchAllSigIDs = NULL;

pchSigIDHead = NULL;
            *pulCntSigIDs = 0;
            ulMaxSigIDs = 0;
            while (IsntPGPError(PGPKeyIterNextUIDSig(SigIter, &Sig))) {

/* This could cause a revoked sig that can't be checked to be marked */
                /*   as revoked when the sig is actually bogus.  MustSigIDs, */
                /*   AllowSigIDs, and self-sigs as signers are always verified and */
                /*   can't be forged. */
                pgpRC = PGPGetSigBoolean(Sig, kPGPSigPropHasUnverifiedRevocation,
                                         &bUnverifiedRevoked);
                CheckException(IsPGPError(pgpRC), EXC_GETTING_PROPERTY_FAILED);

pgpRC = PGPGetSigBoolean(Sig, kPGPSigPropIsExpired, &bExpired);
                CheckException(IsPGPError(pgpRC), EXC_GETTING_PROPERTY_FAILED);

/* Currently, keys in the database are not checked--only incoming */
                /*   keys. */
                if (bCheckValidity) {
```

43

```
        pgpRC = PGPGetSigBoolean(Sig, kPGPSigPropIsTried, &bTried);
        CheckException(IsPGPError(pgpRC), EXC_GETTING_PROPERTY_FAILED);
        pgpRC = PGPGetSigBoolean(Sig, kPGPSigPropIsVerified, &bGood);
        CheckException(IsPGPError(pgpRC), EXC_GETTING_PROPERTY_FAILED);
        pgpRC = PGPGetSigBoolean(Sig, kPGPSigPropIsNotCorrupt, &bWellFormed);
        CheckException(IsPGPError(pgpRC), EXC_GETTING_PROPERTY_FAILED);
        pgpRC = PGPGetSigBoolean(Sig, kPGPSigPropIsRevoked, &bRevoked);
        CheckException(IsPGPError(pgpRC), EXC_GETTING_PROPERTY_FAILED);

/* If any sig that is tried actually fails, return this as an */
        /*   error.  Also, a good sig that isn't revoked but has a    */
        /*   revsig means the revsig is bogus. */
        CheckException(!bWellFormed || bTried && !bGood ||
                       bTried && bGood && !bRevoked && bUnverifiedRevoked,
                       EXC_BOGUS_SIG_FOUND);

/* If bReturnTrustedOnly, skip those without valid sigs from trusted */
        /*    keys. */
        if (bReturnTrustedOnly && (!bTried || !bGood || bExpired))
            continue;
    } if (ulMaxSigIDs == 0 || *pulCntSigIDs >= ulMaxSigIDs) { if (ulMaxSigIDs == 0)
            ulMaxSigIDs = PGP_DEFAULT_SIGS_PER_USERID + 1;
        else
            ulMaxSigIDs *= 2;

pchSigIDHead = (char *)
                       realloc(pchSigIDHead,
                               ulMaxSigIDs * (PGP_SIGNER_ID_LEN + 1));
        CheckException(pchSigIDHead == NULL, EXC_MEMORY_ERROR);
        pchSigID = pchSigIDHead + *pulCntSigIDs * (PGP_SIGNER_ID_LEN + 1);
    }

/* See if a non-exportable sig snuck in. */
    pgpRC = PGPGetSigBoolean(Sig, kPGPSigPropIsExportable, &bExportable);
    CheckException(IsPGPError(pgpRC), EXC_GETTING_PROPERTY_FAILED);

/* If we somehow got a non-exportable signature, just skip it. */
    if (!bExportable) {
        pgpRC = PGPRemoveSig(Sig);
        CheckException(IsPGPError(pgpRC), EXC_REMOVING_CERT_FAILED);
        continue;
    }

/* Untried rev sigs can be bogus, but don't let bogus tried rev sigs */
    /*    get marked as revoked. */
    if (bUnverifiedRevoked)
        pchSigID[0] = '-';
    else if (bExpired)
        pchSigID[0] = 'x';
    else
        pchSigID[0] = '+';

pgpRC = PGPGetKeyIDOfCertifier(Sig, &SigID);
    CheckException(IsPGPError(pgpRC), EXC_GETTING_SIGNER_ID_FAILED);

pgpRC = PGPGetKeyIDString(&SigID, kPGPKeyIDString_Full, szCDKSigID);
    CheckException(IsPGPError(pgpRC), EXC_MEMORY_ERROR);

memcpy(&pchSigID[1], &szCDKSigID[2], PGP_SIGNER_ID_LEN);
```

```
            (*pulCntSigIDs)++;
            pchSigID += PGP_SIGNER_ID_LEN + 1;
        }
    Exit;    /*-- End of Normal Code Block -- */

/* ---------------- Exception Blocks ------------------ */

ExceptionBlock(EXC_MEMORY_ERROR):
        LogError(kErrLevelError, vszMemoryError);
        Debug(LDAP_DEBUG_ERROR, "GetSigIDsOfUserID: out of memory\n", 0, 0, 0);
        ulFRC = kPGPError_OutOfMemory;
    Exit;

ExceptionBlock(EXC_BOGUS_SIG_FOUND):
        LogError(kErrLevelInfo, "Invalid signature on certificate.");
        Debug(LDAP_DEBUG_ERROR,
            "GetSigIDsOfUserID: Invalid signature found.\n", 0, 0, 0);
        ulFRC = kPGPError_KeyInvalid;
    Exit;

ExceptionBlock(EXC_GETTING_PROPERTY_FAILED):
    {
        char        szPGPErrStr[100];

PGPGetErrorString(pgpRC, sizeof(szPGPErrStr), szPGPErrStr);
        LogError(kErrLevelError, "Getting property of certificate failed.  "
                "Library error: %s.", szPGPErrStr);
        Debug(LDAP_DEBUG_ERROR,
            "GetSigIDsOfUserID: Getting a certificate property failed, rc = %d\n",
            pgpRC, 0, 0);
        ulFRC = pgpRC;
    }
    Exit;

ExceptionBlock(EXC_REMOVING_CERT_FAILED):
    {
        char        szPGPErrStr[100];

PGPGetErrorString(pgpRC, sizeof(szPGPErrStr), szPGPErrStr);
        LogError(kErrLevelError, "Removing non-exportable signature failed.  "
                "Library error: %s.", szPGPErrStr);
        Debug(LDAP_DEBUG_ERROR,
            "GetSigIDsOfUserID: Removing non-exportable signature failed, rc = %d\n",
            pgpRC, 0, 0);
        ulFRC = pgpRC;
    }
    Exit;

ExceptionBlock(EXC_GETTING_SIGNER_ID_FAILED):
    {
        char        szPGPErrStr[100];

PGPGetErrorString(pgpRC, sizeof(szPGPErrStr), szPGPErrStr);
        LogError(kErrLevelError, "Getting signer ID failed.  "
                "Library error: %s.", szPGPErrStr);
        Debug(LDAP_DEBUG_ERROR,
            "GetSigIDsOfUserID: Getting the signer ID failed, rc = %d\n",
            pgpRC, 0, 0);
        ulFRC = pgpRC;
    }
    Exit;
```

```
ExitBlock:
    if (ulFRC == 0)
        *ppchAllSigIDs = pchSigIDHead;
    else
        free(pchSigIDHead);

Debug(LDAP_DEBUG_TRACE, "<= GetSigIDsOfUserID, rc=%d\n", ulFRC, 0, 0);
    return ulFRC;
}
```

What is claimed is:

1. In a computer environment providing public key cryptography, a method for creating and managing a crypto policy on a server, said server providing a central repository of public keys for use by a plurality of clients, the method comprising:
    defining a crypto policy comprising a set of constraints specifying one or more conditions which keys submitted to the server must satisfy before being accepted for storage in the central repository of the server;
    receiving a request from a client to store a particular key in the central repository of the server;
    determining whether the particular key satisfies said set of constraints;
    if the particular key satisfies said set of constraints, storing the particular key in the central repository of the server, so that the key is available to other clients from the server; and
    if the particular key does not satisfy said set of constraints, rejecting the particular key from storage in the central repository of the server, so that the key is not available to other clients from the server.

2. The method of claim 1, wherein said set of constraints includes a constraint specifying that the particular key must include a required signature.

3. The method of claim 2, wherein said signature comprises a cryptographic digital signature of a particular entity that has signed the particular key.

4. The method of claim 1, wherein said set of constraints includes a constraint specifying that the particular key may not include a signature which has not been approved.

5. The method of claim 4, further comprising:
    removing from the particular key any signature which has not been approved.

6. The method of claim 1, wherein said set of constraints includes a constraint specifying that the particular key may not include a user identifier (ID) which has not been approved.

7. The method of claim 6, further comprising:
    removing from the particular key any user ID which has not been approved.

8. The method of claim 1, further comprising:
    if the particular key has been rejected, transferring the key to a pending bucket.

9. The method of claim 8, further comprising:
    allowing a user with system administrator privileges to inspect the pending bucket for keys which have been rejected.

10. The method of claim 9, further comprising:
    allowing the user with system administrator privileges to approve any key which has been placed in the pending bucket.

11. The method of claim 9, further comprising:
    allowing the user with system administrator privileges to delete any key which has been placed in the pending bucket.

12. The method of claim 1, wherein said set of constraints is specified by a configuration file.

13. The method of claim 12, wherein said configuration file is configurable only by a user having system administrator privileges.

14. The method of claim 1, further comprising:
    receiving a request from a client for a key which has been accepted for storage in the central repository; and
    satisfying the request by providing that client with a copy of the requested key.

15. The method of claim 1, wherein said request to store a particular key is communicated to the server using LDAP (Lightweight Directory Access Protocol) protocol.

16. The method of claim 1, wherein said request to store a particular key is communicated to the server using HTTP (Hypertext Transport Protocol) protocol.

17. The method of claim 1, further comprising:
    allowing clients to search for keys which have been stored in the central repository.

18. The method of claim 17, wherein keys stored in the central repository may be searched by user-specified criteria selected from one or more of: e-mail address, user name, key identifier (ID), key type, key size, key creation date, and key expiration date.

19. The method of claim 1, further comprising:
    allowing a user with system administrator privileges to disable any key which is stored in the central repository.

20. The method of claim 1, further comprising:
    allowing a user with system administrator privileges to manually add keys to or delete keys from the central repository.

21. The method of claim 1, wherein said particular key supports RSA-based cryptography.

22. The method of claim 1, wherein said particular key supports Diffie-Hellman-based cryptography.

23. The method of claim 1, wherein said particular key comprises a PGP-compatible key.

24. The method of claim 1, further comprising:
    replicating contents of the central repository to another server.

25. The method of claim 1, further comprising:
    defining access privileges for a group of users, for specifying access for those users to keys on the server.

26. The method of claim 25, wherein said access privileges include allowing users to read keys from the server.

27. The method of claim 25, wherein said access privileges include allowing users to add keys to the server.

28. The method of claim 25, wherein said access privileges include allowing users to delete keys from the server.

29. The method of claim 1, wherein said set of constraints includes a constraint specifying that the particular key must include at least one of a plurality of specified signatures.

30. The method of claim 1, wherein said set of constraints includes a constraint specifying that the particular key must include all of a plurality of specified signatures.

31. The method of claim 1, further comprising:
    generating an error message for a key which has been rejected.

32. The method of claim 1, wherein said set of constraints includes a constraint specifying that a particular signature is allowed for the particular key.

33. The method of claim 32, wherein said set of constraints includes a constraint specifying that any signature which has not been specified as allowable is removed from the particular key before it is stored in the central repository.

34. The method of claim 1, wherein said client is connected to the server through a TCP/IP connection.

35. The method of claim 34, wherein said client resides at a particular IP address, and wherein said server applies said set of constraints based, at least in part, on the client's particular IP address.

36. A method for managing availability of public cryptographic keys for use by a plurality of clients, the method comprising:
    defining a set of constraints specifying one or more conditions which keys must satisfy before being made available for use by the clients;

receiving a request to make a particular key available for use by the clients;

automatically applying said set of constraints for determining whether the particular key should be made available for use by the clients; and if the particular key satisfies said set of constraints prior to storage, making the key available to other clients.

37. The method of claim 36, further comprising:

if the particular key does not satisfy said set of constraints, rejecting the key.

38. The method of claim 37, further comprising:

displaying an error message indicating why the key has been rejected.

39. The method of claim 37, further comprising:

designating any rejected key as pending.

40. The method of claim 39, further comprising:

allowing a user with system administrator privileges to accept a key which has been designated as pending.

41. The method of claim 36, wherein said set of constraints includes a constraint specifying that the particular key must include a required signature.

42. The method of claim 41, wherein said signature comprises a cryptographic digital signature of a particular entity that has signed the particular key.

43. The method of claim 36, wherein said set of constraints includes a constraint specifying that the particular key may not include a signature which has not been approved.

44. The method of claim 43, further comprising:

removing from the particular key any signature which has not been approved.

45. The method of claim 36, wherein said set of constraints includes a constraint specifying that the particular key may not include a user identifier (ID) which has not been approved.

46. A system for managing availability of public cryptographic keys for use by a plurality of clients, the system comprising:

a configuration setting defining a policy specifying one or more conditions which keys must satisfy before being made available for use by the clients; and an agent, responsive to a request to make a particular key available for use by the clients, for making the key available to other clients only if the particular key satisfies said policy.

47. The system of claim 46, wherein said agent rejects the particular key if the key does not satisfy said policy.

48. The system of claim 47, wherein said agent optionally returns an error message indicating why the key has been rejected.

49. The system of claim 47, wherein said agent designates any rejected key as pending.

50. The system of claim 46, wherein said policy includes a condition specifying that the particular key must include a required signature.

* * * * *